Jan. 4, 1949.   L. R. LUDWIG   2,458,010
TOTALLY ENCLOSED NONVENTILATED MOTOR
Filed March 20, 1947
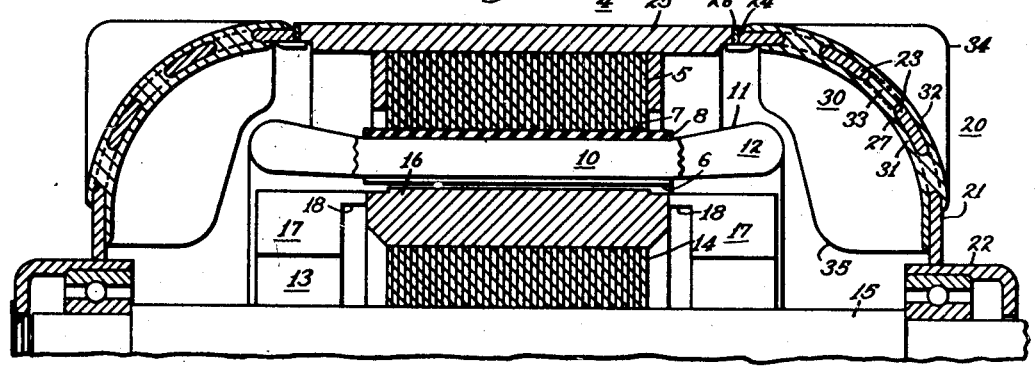
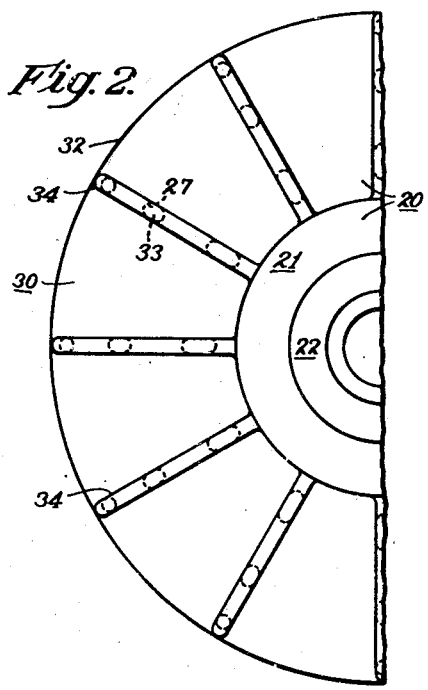
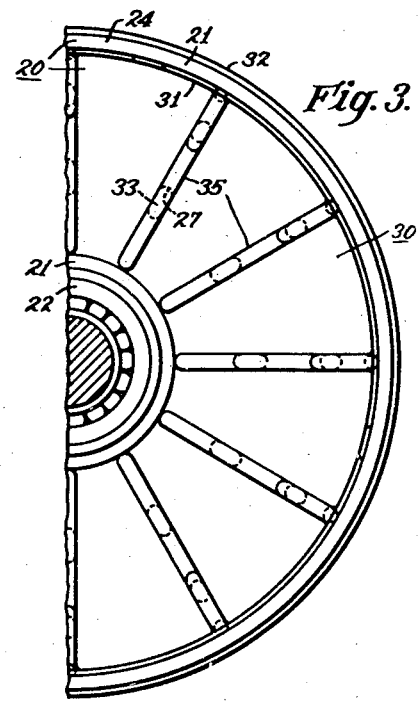
WITNESSES:
Edward Michaels
Nw. C. Groome
INVENTOR
Leon R. Ludwig.
BY O. B. Buchanan
ATTORNEY Patented Jan. 4, 1949

2,458,010

UNITED STATES PATENT OFFICE 2,458,010

TOTALLY ENCLOSED NONVENTILATED MOTOR

Leon R. Ludwig, Buffalo, N. Y., assignor to Westinghouse Electric Corporation, East Pittsburgh, Pa., a corporation of Pennsylvania Application March 20, 1947, Serial No. 735,838

11 Claims. (Cl. 171—252)

My invention relates to totally enclosed dynamo-electric machines of the type known as nonventilated, that is, a type having no external fans or blowers. In totally-enclosed machines of the type to which my invention relates, the air which is contained within the machine is totally enclosed, by means of imperforate end-brackets which enclose the entire ends of the machine. While my invention is not altogether limited to one particular type of machine, it is primarily adapted for, and will be described in connection with, a totally enclosed non-ventilated induction-motor having a cast squirrel-cage winding.

Totally enclosed motors are used in places where the external air is laden with either sizable chips, filings or other solid particles, or even soft fluffy particles like lint. The total enclosure is for the purpose of keeping these airborne particles from clogging up the air-gap of the machine, or adhering to other air-passages or to the surface of the winding-insulation, thus interfering with heat-transfer. The airgaps of commercial squirrel-cage motors, in the range between 5 horsepower and 75 horsepower, more or less, are vulnerable to such contamination, because it is necessary to make these airgaps as small as is mechanically possible, in conformity with a reasonable cost of manufacturing and maintenance, in order to secure the performance-characteristics which are required of these general-utility commercial motors.

When the external air is not too linty, fan-cooled totally enclosed motors are usable, having an external fan for blowing the external air over the outside of the total enclosure, for cooling the same. However, when the external air is quite linty, even this external fan cannot be utilized, because the lint adheres to the fan-blades and quickly interferes with their effective functioning. It is for this type of service that my improved motor is primarily designed.

The primary object of my invention is to produce a totally enclosed non-ventilated motor which will be as small in size and as low in cost, as is possible, while still achieving the required commercial performance-characteristics. One of the first items, in the cost of manufacturing an induction motor, is the cost of the primary copper. The primary copper consists of insulated copper conductors, which must be wound and processed, and must then be laboriously inserted into the stator-slots, at a considerable labor-cost. The secondary copper (so called), or conductor-material (because it is usually cast aluminum), is relatively inexpensive, because it is cast in place. With these thoughts in mind, I have devised an entirely new electrical design for this type of motor, built around the principle of utilizing the smallest possible amount of primary copper.

Temperature-resistant insulating materials are available, so that the primary copper could be worked at a rather high temperature, at an increased cost, because of the higher cost of high-temperature insulation. However, a high copper temperature is not desirable, because the copper-resistance increases rapidly with its temperature, so that, if the primary copper is worked at a high temperature, more primary copper will be needed, thus increasing the cost of this most costly part of the motor.

However, all totally enclosed motors are characterized by much higher operating-temperatures than open or protected motors. The high operating-temperature does not particularly harm the rotor-member, because it consists of a bundle of iron laminations with an integrally cast aluminum squirrel-cage winding. A high temperature increases the resistance of the aluminum squirrel-cage winding, but this can be offset by using more aluminum, which, as has been pointed out, does not cost much, because it is cast. The stator-iron, that is, the stator-core and the frame, necessarily run hot, in an enclosed motor, because all of the heat of the stator, plus the heat of the rotor, must find its way out through the stator-frame. The high temperature does not materially affect the magnetic properties of the iron.

It is an object of my invention, therefore, to provide an improved motor, of this type, in which the primary copper is kept relatively cool, cooler than the primary iron. To this end, I line the stator-slots with exceptionally thick slot-liners of a material which is chosen for the highest available heat-insulating properties. To this end, also, I provide improved ventilating-means for the end-turns of the primary windings, so that the heat which is ventilated in the primary windings is withdrawn from these end-turns.

More specifically, it is an object of my invention to provide an improved end-turn ventilating-means which is featured by special end-brackets having both internal and external heat-transfer fins.

With the foregoing and other objects in view, my invention consists in the combinations, systems, assemblies, structures, parts and cooling and manufacturing means and methods hereinafter described and claimed, and illustrated in the accompanying drawing, wherein Figure 1 is a longitudinal sectional view of the top half of a motor embodying my invention.

Fig. 2 is an end view of the left-hand half of the motor, and

Fig. 3 is an inside end-view of the right-hand half of the left-hand end-bracket, removed.

In the illustrated form of embodiment of my motor, there is a stator-member 4 and a laminated stator-core 5 with a cylindrical airgap-bore 6 therein. The stator-core 5 is provided with winding-receiving slots 7, which are lined with unusually thick, and high heat-insulating, slot-liners 8. The stator-slots 7 receive the straight coil-sides 10 of a primary winding 11, having end-turns 12 projecting from each end of the stator-core.

The machine also has a rotar-member 13 having a cylindrical laminated rotor-core 14 which is carried by a shaft 15. The rotor-core is provided with a die-cast aluminum squirrel-cage winding 16, in a known manner. The rotor is also provided with two fan-means 17, one at each end of the rotor-core. These fan-means may be either separate from the squirrel-cage member 16, or they may be cast integrally therewith, in a known manner. I have illustrated the fan-means 17 as being cast integrally with the squirrel-cage winding 16. It is desirable, in accordance with my invention, that the two fan-means 17 shall not be in very close thermal or heat-conducting relation to the squirrel-cage winding 16, because it is quite permissible for the squirrel-cage winding 16 to run hot, but it is very urgent that the primary end-windings 12 shall run as cool as possible, and hence it is desirable that the two fan-means 17, which are disposed under the end-turns 12, at the two ends of the machine, shall run cool, so as not to unduly heat the internal air which is utilized to cool the stator end-turns 12. In order to minimize the rate of heat-transfer between the squirrel-cage winding 16 and the two sets of fan-blades 17, I utilize reduced-area neck-portions 18 for joining the fan-blades to the end-rings of the squirrel-cage winding 16.

The motor also comprises two imperforate, machine-enclosing, bearing-supporting bracket-means 20, one at each end of the machine. In accordance with a preferred form of embodiment of my invention, each bracket-means 20 is composed essentially of two parts, of dissimiliar metals, comprising first a bracket-proper 21, having a centrally located, shaft-supporting bearing 22, and a radially outwardly and axially inwardly extending cup-shaped portion 23, having its rim 24 substantially air-tightly secured to the stator-member 4, at the rear portion or outer diameter of the core 5 or of a surrounding stator-frame 25, so that the stator end-turns 12 are enclosed, with a space between said end-turns and the bracket at each end of the machine. The brackets 21 are made from a metal which is chosen for a relatively high strength and a relatively high melting-point.

As it is desirable for the bracket 21 to run as cool as possible, in order to provide the maximum cooling-effect for the stator-end turns 12, it is desirable to have the rims 24 of the cup-shaped bracket-portions 23 in poor heat-exchange relation to the stator-member, which may be accomplished by utilizing suitable heat-insulating gaskets 26, as shown.

The cup-shaped portion 23 of each bracket 21 is provided with perforations, preferably in the form of slots 27, which are closed by means of a cast heat-transfer metal-portion, or bracket-covering 30, which is made of a metal having relatively low strength, relatively light weight, and a relatively low melting-point. Each heat-transfer bracket-covering 30 has an inner portion 31 which completely lines the inside of its cup-shaped bracket-portion 23, and an outer portion 32 completely lining the outside of its cup-shaped bracket-portion 23, with integral joining-portions 33 filling the bracket-perforations 27 and joining the inner and outer lining-portions 31 and 32 of the heat-transfer bracket-covering 30. The outer lining-portion 32 may be provided with external heat-radiating fins 34, which may be advantageously shaped so that they fill or occupy the ordinarily unused curved spaces at the outsides of the curved cup-portions 23 of the end-brackets, so that the overall contour of the motor, including the external fins 34, shall be substantially a completely filled cylinder, as indicated in Fig. 1. It is usually desirable also to provide internal heat-transfer fins 35 on the inner lining 31 of the bracket-covering 30.

It is usually desirable to make the bracket-proper 21 of steel, and of a size and weight which is the smallest possible, in consideration of its primary function of supplying the necessary mechanical strength and rigidity. It is usually desirable to make the heat-transfer metal lining-portion 30 of aluminum, or other light-weight, low-melting-point metal, having a sufficient heat-conductivity. The aluminum covering 30 is preferably cast integrally in place on its perforated steel bracket 21, so that the whole bracket-assembly 20 is an imperforate bracket, imperforate in the sense of having no ventilating-openings, and having a direct metal heat-transfer path from the internal fins 35 to the external fins 34.

As previously intimated, the design of my machine is such that all parts of the machine run quite hot, except the primary winding 11, the two fan-means 17, and the end-brackets 20. In operation, each of the fan-means 17 sets up a lively circulation of the internal air which is trapped within the bracket 20 at that end of the machine. This air blows radially outwardly over and around the primary end-turns 12, and hence axially outwardly and radially inwardly over the inner lining 31 of the bracket, giving up its heat to the internal fins 35, and thence returning, cooled, to the fan for recirculation. The bracket-lining or covering 30 carries away the heat, by direct metallic conduction, from the internal fins 35 and the inner lining 31, through the integral joining-portions 33 which fill the bracket-slots 27, to the integral outer lining 32 and the integral external fins 34, from which the heat is directly radiated to the external atmosphere which surrounds the motor. The slot-lining coil-sides 10 of the primary winding 11 are cooled by metallic heat-conduction through the copper of the primary winding, from the end-turns 12 at the two ends of the machine. The extra-heavy, extra-insulating slot-liners 8 serve to prevent the heating of the coil-sides 10 from the relatively hot stator-core 5. The heat of the rotor-member 13, as well as the heat-losses in the stator-iron 5, eventually find their way out through the stator-core 5 and the stator-frame 25, from which the heat is radiated to the external atmosphere.

An important incidental advantage of my invention is that the brackets 21 run cool, and hence keep the bearings 22 cool, thus avoiding the lubricant-troubles which are encountered when bearings run at a high temperature.

While I have illustrated my invention in a single and preferred form of embodiment, I have not attempted to illustrate a scale-drawing of an actual motor, having been content to illustrate the general principles of my invention, which are susceptible of considerable variation and refinement, in different designs. I desire, therefore, that the appended claims shall be accorded the broadest construction consistent with their language.

I claim as my invention:

1. A totally enclosed non-ventilated dynamo-electric machine comprising a stator-member having a stator-core with an airgap-bore therein, and a stator-winding having end-turns projecting from each end of the stator-core, a rotor-member having a rotor-core rotating within the stator-bore, said rotor-member also including a shaft and two fan-means, one under each of the stator end-windings at the two ends of the machine, two perforated machine-enclosing, bearing-supporting brackets, one at each end of the machine, each bracket having a centrally located shaft-supporting bearing and a radially outwardly and axially inwardly extending cup-shaped portion having its rim substantially air-tightly secured to the stator-member, so that the stator end-turns are enclosed, with a ventilating space between said end-turns and the bracket at that end of the machine, each bracket having a plurality of perforations in its cup-shaped portion, each bracket being made of a metal having relatively high strength and a relatively high melting-point, and a cast heat-transfer metal-portion, of relatively low strength, relatively light weight and a relatively low melting-point, associated with each cup-shaped bracket-portion, each heat-transfer metal-portion having an inner portion completely lining the inside of its cup-shaped bracket-portion, an outer portion completely lining the outside of its cup-shaped bracket-portion, integral joining-portions filling the bracket-perforations and joining the inner and outer portions, and heat-radiating fins on the outer portion.

2. The invention as defined in claim 1, characterized by each heat-transfer metal-portion also having heat-radiating fins on its inner portion.

3. The invention as defined in claim 1, characterized by said machine being a squirrel-cage induction-motor having a cast squirrel-cage winding on the rotor-core, the stator-winding being the primary winding and having straight slot-lying coil-sides, the primary core having slots for said coil-sides and slot-liners of good heat-insulating qualities, the stator and rotor cores having substantially no axially extending ventilating-openings therethrough so that the ventilation established by each fan-means is confined to the aforesaid ventilating-space at its own end of the machine, the heat-dissipating conditions and the electrical design being such that the rotor-member and the stator-core both operate at a higher temperature than the primary winding, the primary windings and the bearings being cooled by the heat-transfer metal-portions.

4. The invention as defined in claim 1, characterized by said machine being a squirrel-cage induction-motor having a cast squirrel-cage winding on the rotor-core, the stator-winding being the primary winding and having straight slot-lying coil-sides, the primary core having slots for said coil-sides, and slot-liners of good heat-insulating qualities, the two fan-means being in poor heat-exchange relation to the squirrel-cage winding, the stator and rotor cores having substantially no axially extending ventilating-openings therethrough so that the ventilation established by each fan-means is confined to the aforesaid ventilating-space at its own end of the machine, the heat-dissipating conditions and the electrical design being such that the rotor-member and the stator-core both operate at a higher temperature than the primary windings and the two fan-means, the primary windings and the bearings being cooled by the heat-transfer metal-portions.

5. The invention as defined in claim 1, characterized by said machine being a squirrel-cage induction-motor having a cast squirrel-cage winding on the rotor-core, the stator-winding being the primary winding and having straight slot-lying coil-sides, the primary core having slots for said coil-sides and slot-liners of good heat-insulating qualities, the rims of the cup-shaped portions of the two brackets being in poor heat-exchange relation to the stator-member, the stator and rotor cores having substantially no axially extending ventilating-openings therethrough so that the ventilation established by each fan-means is confined to the aforesaid ventilating-space at its own end of the machine, the heat-dissipating conditions and the electrical design being such that the rotor-member and the stator-core both operate at a higher temperature than the primary windings, the primary windings and the bearings being cooled by the heat-transfer metal-portions.

6. A totally enclosed non-ventilated squirrel-cage induction-motor comprising a stator-member having a stator-core with an airgap-bore therein, and a stator-winding having end-turns projecting from each end of the stator-core, the stator-winding being the primary winding and having straight slot-lying coil-sides, the primary core having slots for said coil-sides and slot-liners of good heat-insulating qualities, a rotor-member having a rotor-core rotating within the stator-bore, a cast squirrel-cage winding on the rotor-core, said rotor-member also including a shaft and two fan-means, one under each of the stator end-windings at the two ends of the machine, two imperforate, machine-enclosing, bearing-supporting bracket-means, one at each end of the machine, each bracket-means having a centrally located shaft-supporting bearing and a radially outwardly and axially inwardly extending cup-shaped portion having its rim substantially air-tightly secured to the stator-member, so that the stator end-turns are enclosed, with a ventilating space between said end-turns and the bracket-means at that end of the machine, and external heat-radiating fins on each cup-shaped bracket-portion, the stator and rotor cores having substantially no axially extending ventilating-openings therethrough so that the ventilation established by each fan-means is confined to the aforesaid ventilating-space at its own end of the machine, the heat-dissipating conditions and the electrical design being such that the rotor-member and the stator-core both operate at a higher temperature than the primary windings, the primary windings and the bearings being cooled by the external heat-radiating fins of the cup-shaped bracket-portions.

7. A totally enclosed non-ventilated squirrel-cage induction-motor comprising a stator-member having a stator-core with an airgap-bore therein, and a stator-winding having end-turns projecting from each end of the stator-core, the stator-winding being the primary winding and having straight slot-lying coil-sides, the primary core having slots for said coil-sides and slot-liners of good heat-insulating qualities, a rotor-member having a rotor-core rotating within the stator-bore, a cast squirrel-cage winding on the rotor-core, said rotor-member also including a shaft and two fan-means, one under each of the stator end-windings at the two ends of the machine, the two fan-means being in poor heat-exchange relation to the squirrel-cage winding, two imperforate, machine-enclosing, bearing-supporting bracket-means, one at each end of the machine, each bracket-means having a centrally located shaft-supporting bearing and a radially outwardly and axially inwardly extending cup-shaped portion having its rim substantially air-tightly secured to the stator-member, so that the stator end-turns are enclosed, with a ventilating space between said end-turns and the bracket-means at that end of the machine, and external heat-radiating fins on each cup-shaped bracket-portion, the stator and rotor cores having substantially no axially extending ventilating-openings therethrough so that the ventilation established by each fan-means is confined to the aforesaid ventilating-space at its own end of the machine, the heat-dissipating conditions and the electrical design being such that the rotor-member and the stator-core both operate at a higher temperature than the primary windings and the two fan-means, the primary windings and the bearings being cooled by the heat-transfer metal-portions.

8. A totally enclosed non-ventilated squirrel-cage induction-motor comprising a stator-member having a stator-core with an airgap-bore therein, and a stator-winding having end-turns projecting from each end of the stator-core, the stator-winding being the primary winding and having straight slot-lying coil-sides, the primary core having slots for said coil-sides and slot-liners of good heat-insulating qualities, a rotor-member having a rotor-core rotating within the stator-bore, a cast squirrel-cage winding on the rotor-core, said rotor-member also including a shaft and two fan-means, one under each of the stator end-windings at the two ends of the machine, two imperforate, machine-enclosing, bearing-supporting bracket-means, one at each end of the machine, each bracket-means having a centrally located shaft-supporting bearing and a radially outwardly and axially inwardly extending cup-shaped portion having its rim substantially air-tightly secured to the stator-member, so that the stator end-turns are enclosed, with a ventilating space between said end-turns and the bracket-means at that end of the machine, and external heat-radiating fins on each cup-shaped bracket-portion, the rims of the cup-shaped portions of the two brackets being in poor heat-exchange relation to the stator-member, the stator and rotor cores having substantially no axially extending ventilating-openings therethrough so that the ventilation established by each fan-means is confined to the aforesaid ventilating-space at its own end of the machine, the heat-dissipating conditions and the electrical design being such that the rotor-member and the stator-core both operate at a higher temperature than the primary windings, the primary windings and the bearings being cooled by the external heat-radiating fins of the cup-shaped bracket-portions.

9. The invention as defined in claim 6, characterized by each cup-shaped bracket-portion also having internal heat-transfer fins.

10. The invention as defined in claim 7, characterized by each cup-shaped bracket-portion also having internal heat-transfer fins.

11. The invention as defined in claim 8, characterized by each cup-shaped bracket-portion also having internal heat-transfer fins.

LEON R. LUDWIG.

REFERENCES CITED

The following references are of record in the file of this patent:

UNITED STATES PATENTS

| Number | Name | Date |
| --- | --- | --- |
| 1,087,166 | Gray | Feb. 17, 1914 |
| 2,185,740 | Smith | Jan. 2, 1940 |
| 2,321,126 | Breuer | June 8, 1943 |